(12) United States Patent
Dixon et al.

(10) Patent No.: US 11,316,459 B2
(45) Date of Patent: Apr. 26, 2022

(54) MOTOR CONTROL SYSTEM

(71) Applicants: TRW Limited, Solihull (GB); TRW Automotive US LLC, Livonia, MI (US); ZF Friedrichshafen AG, Friedrichshafen (DE)

(72) Inventors: Christopher David Dixon, Coventry (GB); Connel Brett Williams, Leamington Spa (GB); Prerit Terway, Rochester Hills, MI (US); Abraham Ghafari, Rochester Hills, MI (US); Hassan Lamsahel, Friedrichshafen (DE); Mesut Er, Friedrichshafen (DE)

(73) Assignees: ZF Automotive UK Limited; ZF Active Safety and Electronics US LLC, Livonia, MI (US); ZF Friedrichshafen AG, Friedrichshafen (DE)

(*) Notice: Subject to any disclaimer, the term of this patent is extended or adjusted under 35 U.S.C. 154(b) by 178 days.

(21) Appl. No.: 16/062,843

(22) PCT Filed: Dec. 16, 2016

(86) PCT No.: PCT/GB2016/053961
§ 371 (c)(1),
(2) Date: Jun. 15, 2018

(87) PCT Pub. No.: WO2017/103605
PCT Pub. Date: Jun. 22, 2017

(65) Prior Publication Data
US 2020/0059180 A1    Feb. 20, 2020

(30) Foreign Application Priority Data
Dec. 16, 2015 (GB) ..................... 1522228

(51) Int. Cl.
*H02P 21/05* (2006.01)
*H02P 21/22* (2016.01)
(Continued)

(52) U.S. Cl.
CPC ............ *H02P 21/05* (2013.01); *H02M 1/38* (2013.01); *H02M 7/53871* (2013.01);
(Continued)

(58) Field of Classification Search
CPC .......... H02P 21/22; H02P 27/12; H02M 1/38; H02M 7/53871
See application file for complete search history.

(56) References Cited

U.S. PATENT DOCUMENTS 5,872,710 A * 2/1999 Kameyama ....... H02M 7/53875
363/131
8,035,334 B2 * 10/2011 Kobayashi .......... H02M 7/5395
318/812

(Continued)

FOREIGN PATENT DOCUMENTS

| GB | 2440559 A | 2/2008 |
| JP | 2006320122 A | 11/2006 |
| JP | 2006320127 A | 11/2006 |

OTHER PUBLICATIONS

Patents Act 1977: Search Report under Section 17(5), Application No. GB1522228.4, dated May 20, 2016.
(Continued)

*Primary Examiner* — Said Bouziane
(74) *Attorney, Agent, or Firm* — Robert James Harwood

(57) ABSTRACT

A control system for an electric motor comprises a controller which receives as an input a demanded motor current and produces at an output an intermediate voltage demand signal, a voltage demand signal correction means arranged to generate a voltage demand correction signal, and a
(Continued)

combining means arranged to combine the intermediate voltage demand signal and the voltage demand correction signal to produce an actual voltage demand signal that is applied to the motor by pulse width modulation of the switches of a motor bridge driver. The correction signal compensates for unwanted non-linearities caused by interlock delays in the switching of the motor bridge switches.

12 Claims, 3 Drawing Sheets

(51) Int. Cl.
*H02M 1/38* (2007.01)
*H02M 7/5387* (2007.01)
*H02P 27/12* (2006.01)
*H02P 21/00* (2016.01)

(52) U.S. Cl.
CPC .............. *H02P 21/22* (2016.02); *H02P 27/12* (2013.01); *H02M 1/385* (2021.05); *H02P 21/0025* (2013.01)

(56) References Cited

U.S. PATENT DOCUMENTS

| | | |
|---|---|---|
| 2011/0273914 A1 | 11/2011 | Kim |
| 2014/0156144 A1 | 6/2014 | Hoshi et al. |
| 2014/0191699 A1* | 7/2014 | Dixon .................... H02P 23/14 318/503 |
| 2015/0251692 A1 | 9/2015 | Mikamo et al. |

OTHER PUBLICATIONS

PCT International Search Report and Written Opinion, Application No. PCT/GB2016/053961, dated Mar. 30, 2017.

* cited by examiner

MOTOR CONTROL SYSTEM

CROSS-REFERENCE TO RELATED APPLICATIONS

This application is a national stage of International Application No. PCT/GB2016/053961, filed 16 Dec. 2016, the disclosures of which are incorporated herein by reference in entirety, and which claimed priority to Great Britain Patent Application No. 1522228.4, filed 16 Dec. 2015, the disclosures of which are incorporated herein by reference in entirety.

BACKGROUND TO THE INVENTION

The present invention relates to the control of electric motors, and in particular to the control of the voltage and current flowing in a PWM controlled electric motor.

A closed loop current controller for an electric motor 1 typically takes the form shown in FIG. 1, where, using vector control provided by a suitable controller, a voltage is applied to each phase winding of the motor and the resultant generated currents measured. The measured currents are compared with a demanded current, and the difference is fed into a controller, typically a closed loop PI controller, which outputs the voltages that are to be applied to the motor in order to minimise the difference. A signal which gives the electrical position of the motor is also required in order to ensure that the voltages are applied to the motor with the correct phase. In the system of FIG. 1 a position sensor is shown but the present invention is equally applicable to a position sensorless system, where the position signal is estimated from other sensor measurements.

The voltage applied to each of the motor phases is typically modulated using pulse width modulation PWM of the switches of a multiphase bridge circuit. A typical bridge circuit 2 is shown in FIG. 2 of the drawings. The bridge comprises, for each phase of the motor, an upper switch connecting the phase to a positive supply rail, and a lower switch connecting the phase to an earth or negative supply rail. The PWM signals are applied to the bridge by a PWM driver 3 which controls the opening and closing of the switch. At any time the switches in an arm of the bridge may all be closed, or one may be open circuit and the other closed circuit so that the phase is connected to positive or negative supply rails. In a known prior art system the input to the PWM driver comprises the voltage output from the PI controller.

It is important to ensure that the top switch in any arm of the bridge is not ON at the same time as the bottom switch in that arm is ON, because this will short the terminals of the power supply. Therefore, an interlock delay is required between the switching of the switches. This is shown in FIG. 3 of the drawings. The interlock is a period where both switches are off and introduces a dead time in which no current flows into or out of the phase.

The applicant has appreciated that the use of an interlock delay distorts the PWM pattern and this introduces a current in the motor that varies asymmetrically around the zero motor current condition. This is shown in FIG. 4 of the drawings where it can be seen that a plot of the demand voltage output from the controller, against the actual motor current exhibits a non-linear behaviour around zero current. This effect is significant over a range of low currents.

Where the motor is used in an electric power steering system, the applicant has appreciated that this non-linear behaviour has a negative effect on the steering feel perceived by the driver. Furthermore, the applicant has appreciated that the non-linearity may vary from bridge to bridge, so not only is the effect of the non-linearity perceived it can feel different from one bridge driver to the next.

SUMMARY OF THE INVENTION

The present invention provides a control system for an electric motor, the control system comprising a controller which receives as an input a demanded motor current, the controller producing at an output an intermediate voltage demand signal, a voltage demand signal correction means arranged to generate a voltage demand correction signal, and a combining means arranged to combine the intermediate voltage demand signal and the voltage demand correction signal to produce an actual voltage demand signal that is applied to the motor by pulse width modulation of the switches of a motor bridge driver, the voltage demand correction signal at least partially compensating for unwanted non-linearity in the relationship between the intermediate voltage demand signal and the motor current caused by interlock delays in the switching of the motor bridge switches.

The applicant has appreciated that the modification of the voltage output from the controller by the use of an appropriate feed forward term within the control loop of the system can be used to remove or at least modify the effects of switching interlock dead time around the zero current point of the motor.

The voltage demand correction signal may compensate by wholly removing the effect of non-linearity due to the interlock delays. Removing the non-linearity improves the steering feel at low motor currents and especially around zero current.

Alternatively the voltage demand correction signal may modify the effect of non-linearity to leave a known amount of non-linearity between the intermediate voltage demand signal and the motor current. For example, it may not remove the non-linearity completely but may bring it into line with a predefined desired non-linearity. This may be useful where a steering system has been tuned to a bridge driver circuit with a certain non-linearity only for a different bridge circuit with a different non-linearity to be used, which may not be compatible with the tuning. As tuning is expensive, this may be used during the life cycle of a steering system to keep the non-linearity in a known range as new bridge drivers are developed.

The controller may comprise a PI controller and may include, at an input stage, a comparator which generates a current difference signal dependent upon the difference between the demanded motor current and the actual current flowing in the motor.

It is preferred that the correction signal generating means generates a voltage demand correction signal that is a function of the demanded motor current, taking as an input a signal that is derived from the demanded motor current. This is preferred because the demanded motor current signal will typically be less noisy than the actual measured currents. The voltage demand correction signal may be a function of the current demand signal in the stationary DQ frame.

The voltage demand correction signal generating means may alternatively generate a voltage demand correction signal that is a function of the actual measured current signal.

The current signal (demanded or actual) prior to being input to the correction signal generating means may be passed through a filter so that the bandwidth of the signal fed to the correction signal generating means does not exceed the bandwidth of the controller.

The cut off frequency of the filter may be matched to the controller bandwidth. It may comprise a first order low pass filter. The filter may be of the form:

$$\frac{a}{1+bz^{-1}}$$

Where a and b are constants.

In one arrangement for instance, the function may use a=1 and b=0.5 as constants.

The voltage demand correction signal may be defined, for each filtered demand (or actual) current value as the difference between the ideal motor current/intermediate demand voltage and the actual motor current/intermediate demand voltage characteristic. The voltage demand correction signal may therefore comprise a voltage value.

The values of the voltage demand correction signal may be generated using a look up table stored in memory, which holds a set of values of input values (either the demanded current or the actual current as appropriate) and a corresponding set of correction signal voltage values. Where the demanded (or actual) motor current is not identical to a stored current value in the table, a correction signal may be generated by interpolating from the two nearest stored current values, ideally one above and one below the demanded current value.

The system may include multiple look up tables stored in a memory and a selection means for selecting one of the look up tables dependent on a property of the bridge driver. This allows the controller to compensate easily for different bridge drivers. The voltage demand signal correction means may be arranged to apply the selected look up table when generating the correction signal.

The selection means may comprise a user operable interface through which the user can manually select the appropriate table.

Of course, instead of a look up table the correction means may use other methods of generating a correction signal from an input current demand signal or measured current. For instance, a non-linear mathematical function may be used that defines the relationship between the current and the correction signal.

The memory may be programmable and the controller may be arranged to learn the non-linearity between the intermediate demand voltage output from the controller and the motor current around zero current due to the interlock delay so as to generate a relationship between demanded motor current value and the correction signal value that is required to correct or at least partially correct the non-linearity. The controller may include a test mode during which the learning occurs.

The control system may include a current sensing means arranged to produce a current sensing output indicative of the electric current in the motor.

The motor may have stationary windings and a rotor, which rotates relative to the windings. The current sensing means may comprise a current sensor arranged to measure current in the motor windings. The current may be measured as two components in the frame of reference of the windings. The current sensing means may comprise transformation means arranged to transform the measured current into the frame of reference of the rotor, for example as torque-generating and non-torque-generating components.

The controller may be arranged to output an intermediate demanded voltage in a frame of reference which is stationary, which may be the frame of reference of the windings and defined, for example, as α and β components, or in a rotating frame of reference, which may be the frame of reference of the rotor, and defined, for example, as D and Q axis components.

Where the intermediate demand voltage is in the DQ frame, the voltage demand correction signal may also be in the DQ frame, and similarly the demanded current signal.

Other advantages of this invention will become apparent to those skilled in the art from the following detailed description of the preferred embodiments, when read in light of the accompanying drawings.

DESCRIPTION OF A PREFERRED EMBODIMENT

Figure 5:
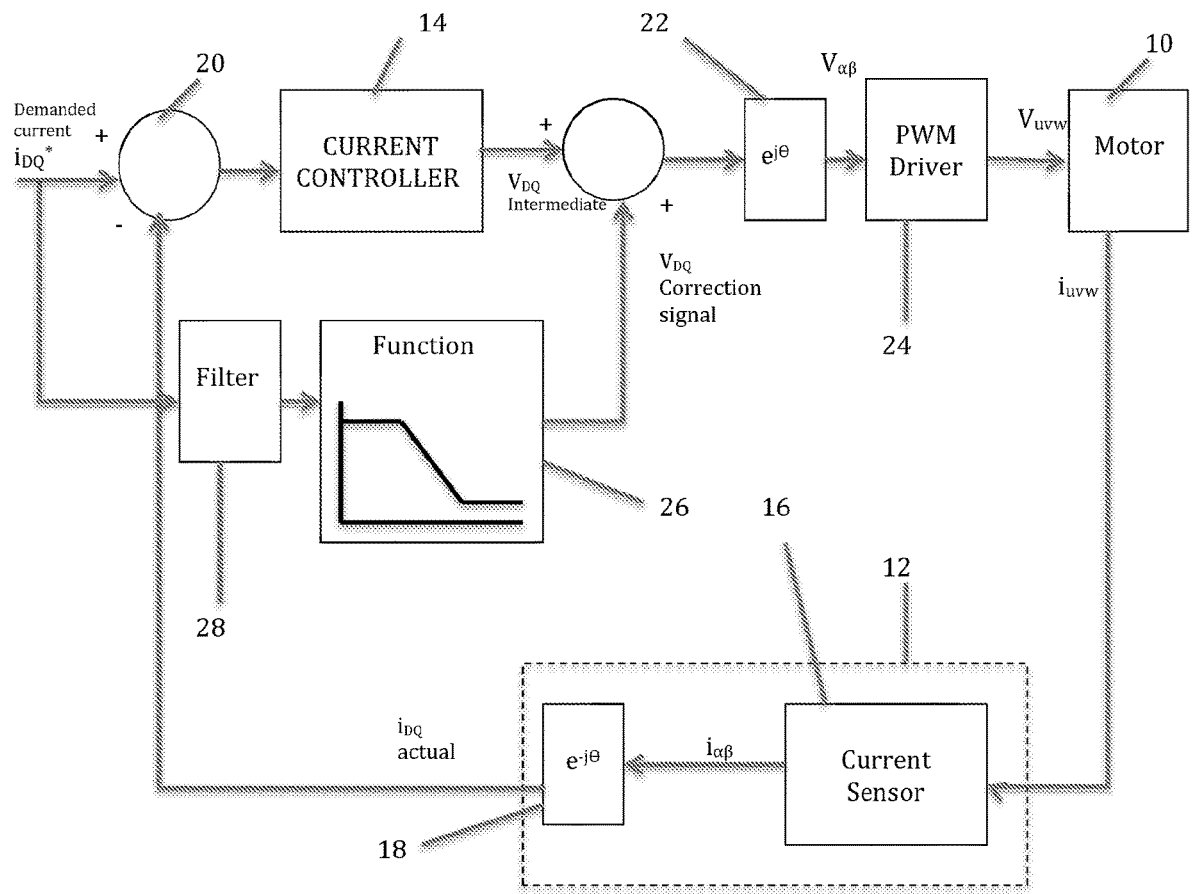
FIG. 5 is a control circuit in accordance with the present invention that corrects the effect of interlock delay.

Referring to FIG. 5 a motor 10 is controlled by a closed loop motor current control system according to an embodiment of the invention comprising a current sensing system 12 and a current controller 14. The current sensing system 12 comprises a current sensor 16 arranged to measure the currents $i_U$, $i_V$, $i_W$ in the three phases of the motor, which comprise stationary windings, and output a signal indicative of the current vector in the stationary coordinates having α and β components. The output of the current sensor may be corrected for noise if required so as best to indicate the actual current in the motor phases. The current sensing system further comprises a coordinate transformation block 18 arranged to convert the current vector from the α and β components in the stationary reference from, to D and Q components $i_D$ and $i_Q$ defining the current vector in the rotor reference frame, which rotates relative to the fixed windings, with the Q axis current being the torque generating component and the D axis current being non-torque-generating. A comparator 20 receives the D and Q currents from the current sensing system 12 and compares them with demanded D and Q current components to generate an error signal. The current controller 14 receives the current error and outputs a demanded voltage vector, in the form of a D and Q axis voltage demand $V_{DQ}$ calculated to reduce the current error so that the measured current vector approaches the demanded current vector. A further transformation block 22 receives the voltage demand from the current controller and converts it to a and β components $V_{\alpha\beta}$ which are input to a PWM driver 24 which is arranged to control a number of switches of a motor drive bridge to apply voltages to the phase windings of the motor 10 in a PWM pattern which produces the net voltage in the windings having a magnitude and direction corresponding to the voltage demand vector.

Figure 1:
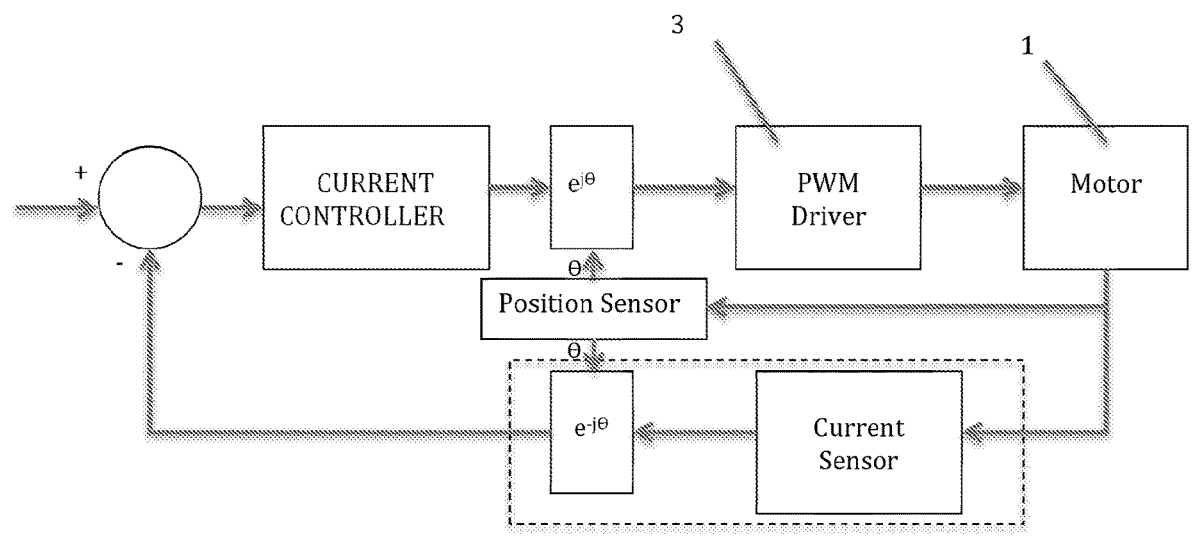
FIG. 1 is a diagram of a known closed loop current control system for a motor.
Figure 2:
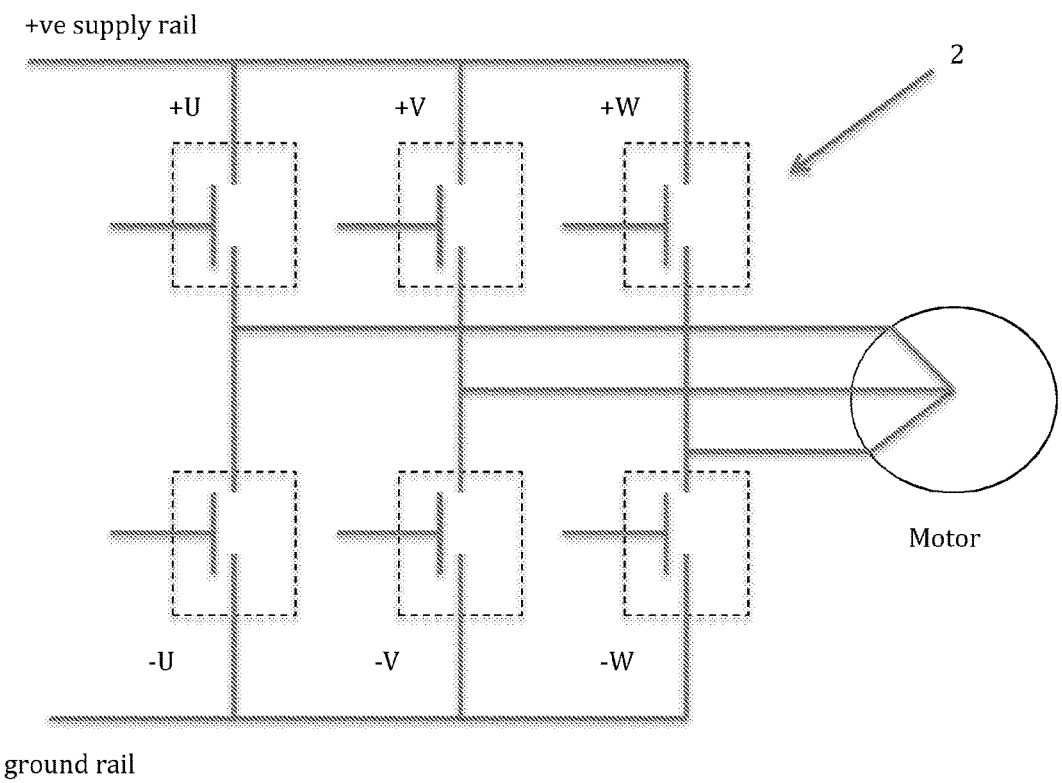
FIG. 2 is a diagram showing the switches of a bridge driver used in the system of FIG. 1.
Figure 3:
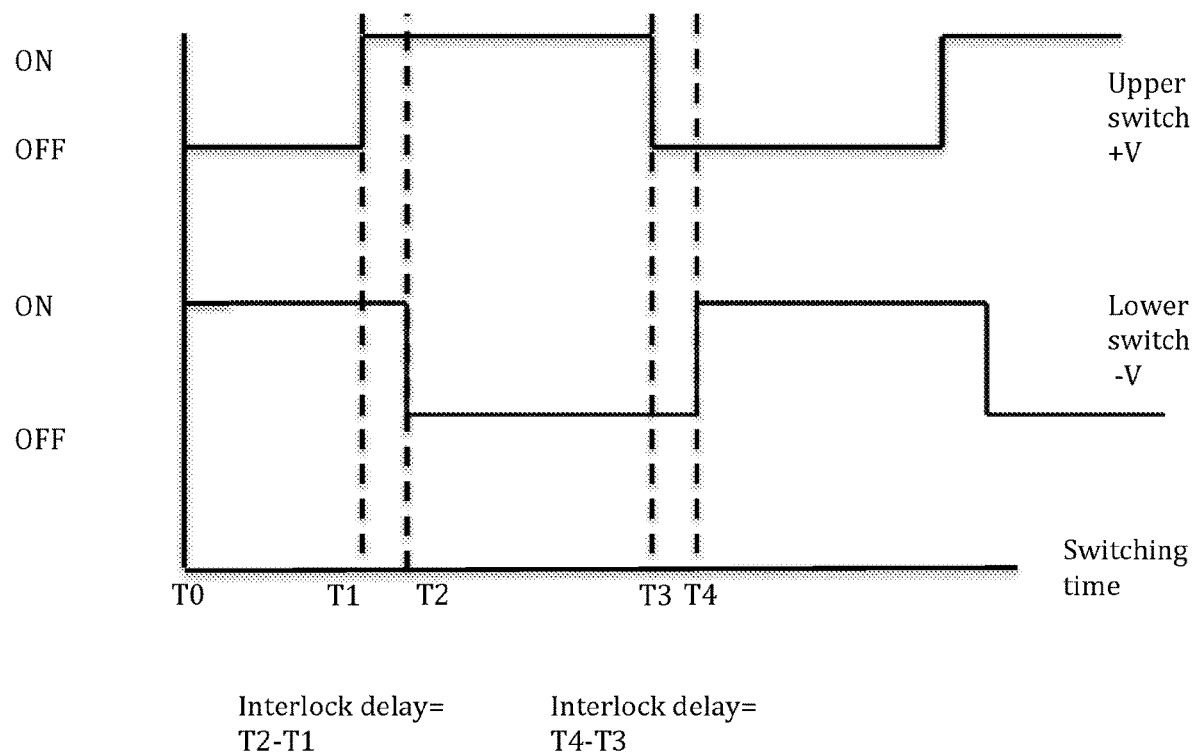
FIG. 3 is a diagram showing the effect of interlock delay between opening and closing of the switches in one arm of the bridge, leading to dead time in which no current flows in a phase of the motor.

The PWM driver converts the voltage demand signal fed into the driver into PWM signals for the top and bottom switches of a motor drive bridge. FIG. 2 shows a typical bridge. To ensure that the top switch in any arm of the bridge is not open when the bottom switch of the same arm is open, an interlock delay is introduced. This is applied either in the PWM driver or by the bridge itself. This introduces non-linearity to the PWM pattern and to the motor current around zero current because the PI controller, like all controllers of that kind, assumes a linear relationship between the voltage demand and the motor current. This expected linear relationship between current and voltage in an ideal motor with no interlock is governed by Ohms law where V=IR. i.e. V is proportional to I because the resistance of a phase winding of an ideal motor is constant. The effect of the interlock is to introduce times where the motor resistance is in effect very large (in practice around 8 times the normal resistance) which causes the current in the motor for a given voltage to be lower than expected.

The control system is therefore arranged to apply a correction signal to the output of the PI controller which modifies the demand voltage, producing an actual demand voltage in the DQ frame that is fed to the PWM driver in place of the intermediate voltage demand output from the controller 14. The correction signal corrects for the effect of the interlock delay.

The correction signal is generated by a correction signal generating means 26, as a function of the current demand signal IDQ, and is based on values stored in a look up table in a memory. The input to the correction signal generating means in the example of FIG. 5 is the demanded motor current.

Prior to feeding the demanded motor current signal into the voltage demand correction means it is passed through a filter. In this example a discrete first order low pass filter 28 is used. Of course this filter could form a part of the correction means. The function of the filter is to ensure that the bandwidth of the demanded current signal that is used to generate the voltage demand correction signal does not exceed the bandwidth of the controller 14. By ensuring the bandwidth of the correction signal does not exceed that of the intermediate voltage demand signal which would have a detrimental effect on the behaviour of the PI controller.

Figure 4:
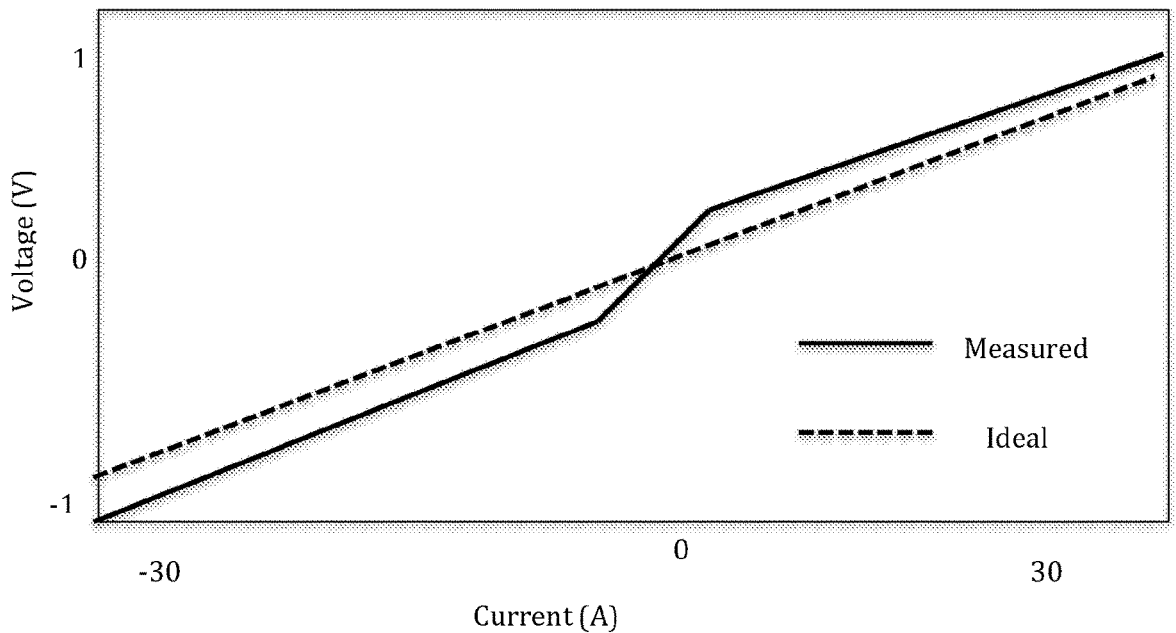
FIG. 4 is a plot showing the voltage demand signal applied to the bridge driver versus the actual motor current with the non-linearity due to interlock delay clearly visible.
Figure 6:
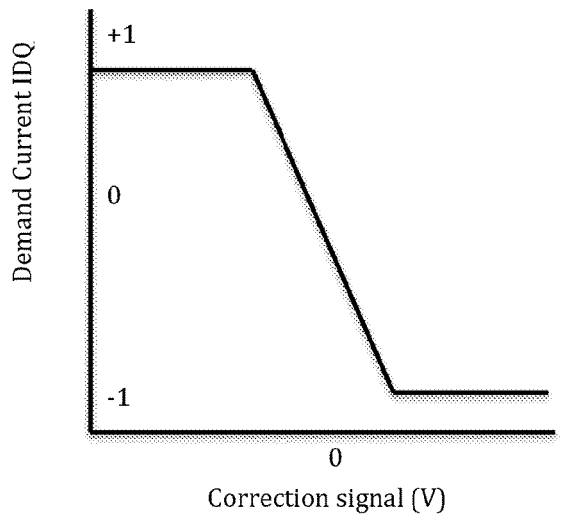
FIG. 6 is a diagram showing the relationship between the value of a correction signal and the demanded current as defined by a look up table stored in a memory.

FIG. 6 is a plot of demanded current $I_{DQ}$ against correction signal voltage in the DQ frame for correcting the non-linearity shown in FIG. 4. Note that the plot is in effect an inverse of the non-linearity that is to be corrected and the values for the correction signal are equal to the difference between the ideal characteristic and the actual characteristic at any point along the V/I plot curve of FIG. 4.

The correction signal is added to the intermediate voltage demand signal in this example to produce the actual voltage demand signal fed to the PWM driver 24. In an alternative it could have the opposite sign to the intermediate voltage demand signal and be subtracted from that signal. In other arrangements the correction signal could be a scaling factor that is multiplied with the intermediate demand signal, or which is divided into the intermediate demand signal.

Figure 7:
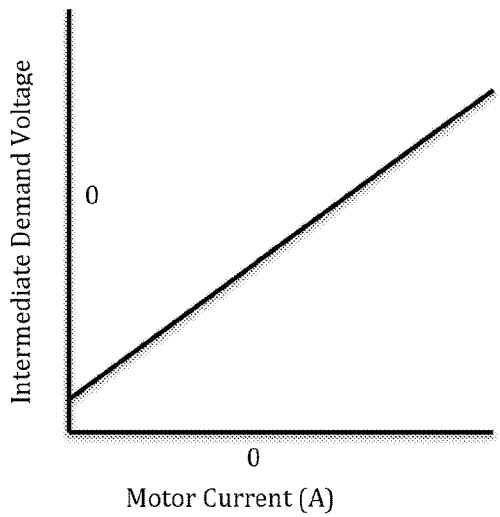
FIG. 7 shows the effect applying the correction signal has on the linearity of the motor.

FIG. 7 is a plot showing the effect of the voltage demand correction signal on the relationship between the intermediate voltage demand signal generated by the controller and the actual current in the motor. As can be seen it is far more linear and closer to the ideal because of the correction applied by the correction signal. The actual voltage demand signal is no longer a linear function of the demanded current, the non-linearity compensating for the reverse non-linearity in the V-I transfer function of the bridge.

The control system may advantageously be used in an electric power steering system where the motor applies an assistance torque to the steering that assists a driver to turn the wheel. Correcting the non-linearity around the zero current may greatly improve the steering feel as perceived by a trained driver.

Whilst the embodiment shown fully removes the effect of the non-linearity around zero current, or at least gets close to fully removing it, the invention may be applied such that the non-linearity is not fully removed but instead is corrected to bring the non-linearity into line with a predefined non-linearity. For instance, where a system has been designed around a first non-linear function that is characteristic of a known bridge circuit and then a different bridge circuit with a different non-linearity is used, the invention may be used to make the different bridge circuit appear to give the same performance as the first bridge. This ensures that the motor performs consistently regardless of which bridge is used. In some applications, such as an electric power steering system, this may be critical to providing consistent performance and a good steering feel for a given steering tune, removing the need to retune the steering system which is a time consuming process.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A control system for an electric motor, the control system comprising:
   a controller which receives as an input a demanded motor current, the controller producing at an output an intermediate voltage demand signal,
   a voltage demand signal correction means arranged to receive the demanded motor current and generate a voltage demand correction signal which directly corresponds to a demanded motor current value stored in a given data table disposed within memory, wherein the given data table is selected from multiple data tables disposed within the memory based on a property of a motor bridge driver for driving a motor, wherein each data table is associated with a different motor bridge driver for driving the motor, and
   a combining means arranged to combine the intermediate voltage demand signal and the voltage demand correction signal to produce an actual voltage demand signal that is applied to the electric motor by pulse width modulation of switches of the motor bridge driver,
   wherein the voltage demand correction signal is determined solely upon the value of the demanded motor current which is received by the voltage demand signal correction means.

2. The control system according to claim 1 in which the controller comprises a PI controller that includes, at an input stage, a comparator which generates a current difference signal dependent upon the difference between the demanded motor current and an actual current flowing in the electric motor.

3. The control system according to claim 1 in which the voltage demand signal correction means generates the voltage demand correction signal by taking as an input a signal that is derived from the demanded motor current.

4. The control system according to claim 3 in which the demanded motor current signal input to the voltage demand signal correction means is passed through a filter so that a bandwidth of the signal fed to the voltage demand signal correction means does not exceed a bandwidth of the controller.

5. The control system according to claim 4 in which a cut off frequency of the filter is matched to the bandwidth of the controller.

6. The control system according to claim 4 in which the filter comprises a first order low pass filter.

7. The control system according to claim 1 in which the given data table comprises a look up table that holds a set of demanded motor current values and a corresponding set of correction signal voltage values.

8. The control system according to claim 1 in which the controller is arranged to output an intermediate demanded voltage in a frame of reference of a rotor of the electric motor, and defined as D and Q axis components, and wherein the voltage demand correction signal is in the DQ frame.

9. The control system according to claim 1, wherein the voltage demand correction signal is determined without taking an actual current flowing in the electric motor into account.

10. The control system according to claim 1, wherein the known amount of non-linearity left is tuned to a non-linearity in the motor bridge driver.

11. The control system according to claim 1, wherein the given data table is selected from the multiple data tables in response to a user input.

12. The control system according to claim 1, wherein the voltage demand signal correction means:
    interpolate from two neighboring values in the given table representative of a respective demanded motor current value to identify the demanded motor current value; and
    generate the voltage demand correction signal based on the demanded motor current value.

* * * * *